United States Patent [19]

Takeuchi

[11] Patent Number: 5,028,126
[45] Date of Patent: Jul. 2, 1991

[54] FOLDABLE SPECTACLE FRAME
[75] Inventor: Yasushi Takeuchi, Hiratsuka, Japan
[73] Assignee: Tamaki Optical Co., Ltd., Osaka, Japan
[21] Appl. No.: 501,035
[22] Filed: Mar. 29, 1990
[51] Int. Cl.⁵ .............................................. G02C 5/08
[52] U.S. Cl. ....................................... 351/63; 351/153
[58] Field of Search .................... 351/41, 63, 64, 158, 351/153

[56] References Cited
U.S. PATENT DOCUMENTS
2,537,248  1/1951  Vigano .................................. 351/63

Primary Examiner—Paul M. Dzierzynski
Attorney, Agent, or Firm—Arnold B. Silverman

[57] ABSTRACT

A spectacle frame comprising a pair of lens frames, a pair of temples hingedly connected to the outer portions of the respective lens frames, bridges each projecting from the inner portion of one of the lens frames toward the other lens frame, and a hinge portion provided at the forward ends of the bridges to make the lens frames inwardly foldable. The hinge portion has a pivot pin inclined at a small angle with a vertical line, so that when the spectacle frame is folded, the inner faces of the lens frames are opposed to each other with the temples opposed to the outer faces of the lens frames.

4 Claims, 3 Drawing Sheets

FOLDABLE SPECTACLE FRAME

FIELD OF THE INVENTION

The present invention relates to improvements in spectacle frames, and more particularly to a spectacle frame which is foldable to a flat form of the smallest possible size.

BACKGROUND OF THE INVENTION

For example, spectacles for the aged are usually carried about and worn only for reading. Accordingly, various spectacle frames have heretofore been proposed which are portable with convenience.

From the viewpoint of foldability to a small size, a spectacle frame is known which is foldable at three points as seen in FIG. 1 and which comprises a pair of lens frames hingedly connected together at the midportion therebetween, and temples of a minimum length to support the lens frames on the wearer free of trouble, i.e., a length slightly longer than the lateral width of the lens frames.

The hinge between the lens frames is so constructed that bridges 8, 8 projecting from the inner portions 2b, 2b of the respective lens frames are movable about a vertical pivot pin 16 as shown in FIG. 8. The spectacle frame therefore has the problem that although it is inwardly foldable to a reduced size to the greatest possible extent, the temples 6, 6 are opposed to each other to make the folded frame bulky as shown in FIGS. 9 and 10. Consequently, a case used for accommodating the spectacles also becomes bulky, bulging the pocket of a garment when the case is placed therein.

The present invention has been accomplished in view of the above problem.

SUMMARY OF THE INVENTION

The main object of the present invention is to provide a spectacle frame which is foldable to a flat form of minimized size.

The spectacle frame of the present invention comprises a pair of lens frames, a pair of temples hingedly connected to the outer portions of the respective lens frames, bridges each projecting from the inner portion of one of the lens frames toward the other lens frame, and a hinge portion provided at the forward ends of the bridges to make the lens frames inwardly foldable, the hinge portion having a pivot pin inclined at a small angle with a vertical line, so that when the spectacle frame is folded, the inner faces of the lens frames are opposed to each other with the temples opposed to the outer faces of the lens frames.

DESCRIPTION OF THE PREFERRED EMBODIMENT

A spectacle frame of the present invention will be described below with reference to the illustrated embodiment. The embodiment is given for illustrative purposes only and should not be construed as limiting the invention in any way.

Figure 1:
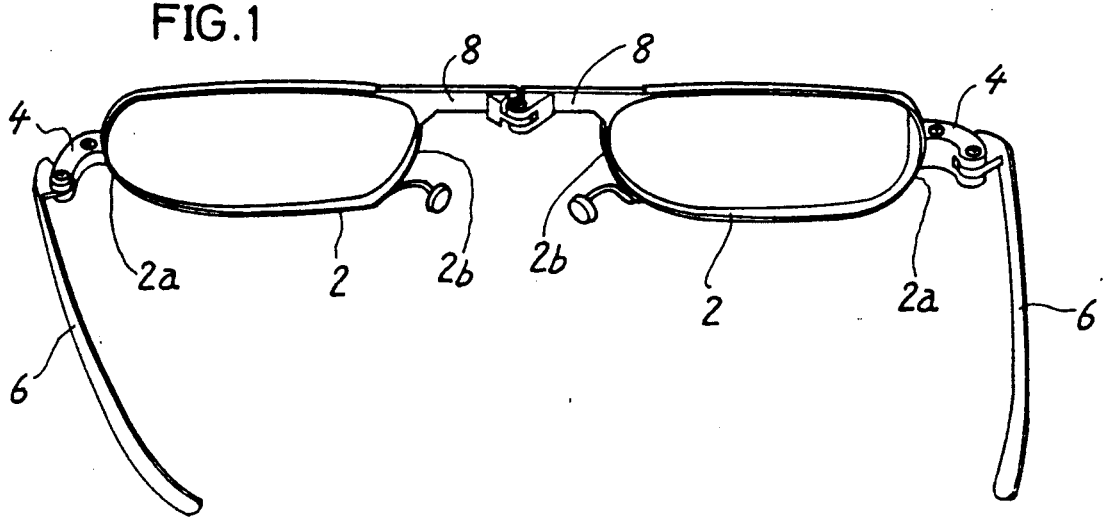
FIG. 1 is a perspective view of a spectacle frame which is foldable at three points.

With reference to FIG. 1, the spectacle frame of the present invention comprises a pair of lens frames 2, 2 having connectors 4, 4 at their outer portions 2a, 2a, and a pair of temples 6, 6 attached to the outer ends of the connectors 4, 4 and pivotally movable toward the inner faces of the respective lens frames 2, 2. When required, a member made of rubber, silicone or like resin material can be provided on the outer end of each temple 6 for preventing slippage of the temple when the spectacles are worn.

A bridge 8 extends from the inner portion 2b of each lens frame 2 toward the other lens frame. A hinge portion is provided at the forward ends of the bridges 8, 8.

Figure 2:
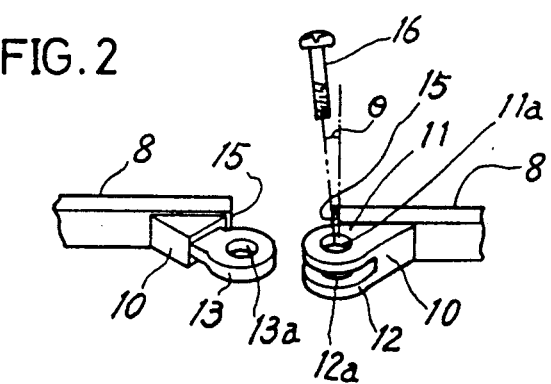
FIG. 2 is an exploded perspective view showing a hinge portion of both brides of the spectacle frame of the invention.
Figure 3:
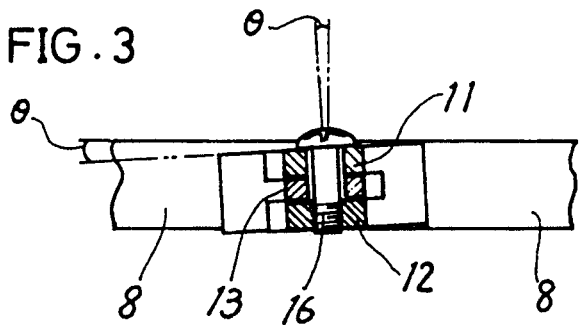
FIG. 3 is a view in section taken along the line A—A in FIG. 5 and showing the hinge portion of the bridges.

The hinge portion characteristic of the present invention will be described next with reference to Figs. 2 and 3. One of the bridges (the right bridge in these drawings) is formed in the vicinity of its forward end with a block 10 projecting inward. The block 10 has upper and lower projections 11,12 projecting from the outer end thereof inward in parallel to each other and defining a recess therebetween. As shown in FIG. 3, the projections 11, 12 are inclined at a small angle 8 with a horizontal plane.

Figure 4:
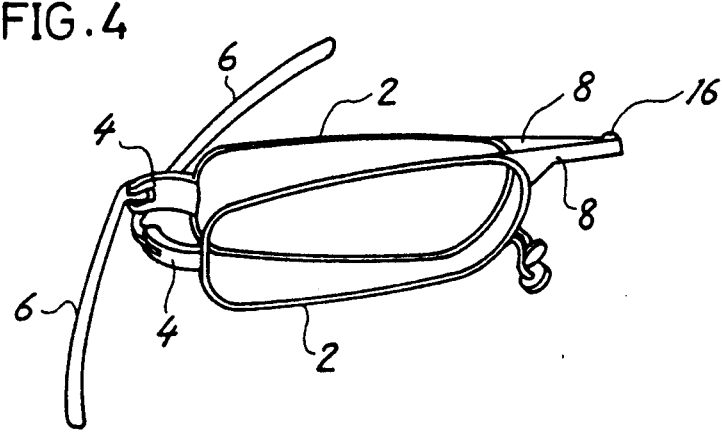
FIG. 4 is a perspective view showing the spectacle frame of the invention as folded inward at the hinge portion.

The other bridge (the left bridge shown) is formed in the vicinity of its forward end with a block 10 projecting inward. The block 10 has a projection 13 projecting from the central portion of its outer end and fitting in the recess of the right bridge. With respect to a horizontal plane, the projection 13 is inclined at the same angle θ as the projections 11, 12. The angle of inclination is determined in accordance with the width of the lens frames 2, 2 so that the opposite connectors 4, 4 will not collide with each other when the lens frames are folded as shown in FIG. 4. The angle of inclination generally proposed is in the range of about 3 to about 15 degrees.

The projection 11 is formed with a hole 11a, the projection 12 with a bore 12a extending or not extending therethrough, and the projection 13 with a hole 13a. A pivot pin 16 is fitted in these holes and the bore. As shown in FIG. 3, the pivot pin 16 loosely extends through the holes 11a, 13a and is screwed in the bore 12a to render the bridges 8, 8 movable about the pin 16. Instead of being screwed in the bore 12a, the pivot pin 16 can be made to extend through the bore 12a, with the projecting end fastened with a nut.

In corresponding relationship with the angle of inclination 8 of the projections 11, 12, 13, the pivot pin 16 is inserted as inclined at the angle θ with a vertical line.

The two bridges 8, 8 bear against each other at their forward free end faces 15, 15, which therefore serve as a stopper against pivotal movement.

Figure 5:
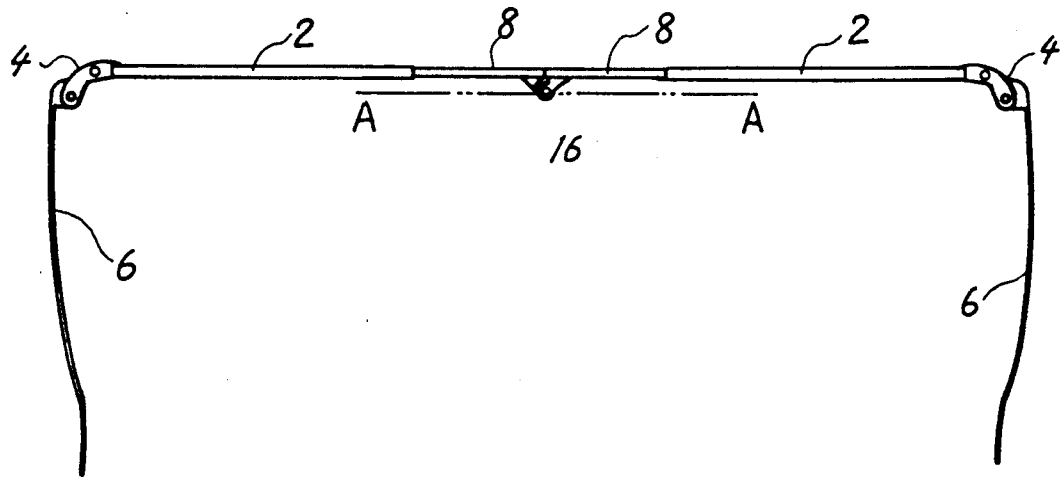
FIG. 5 is a plan view of the spectacle frame which is foldable at three points.
Figure 6:
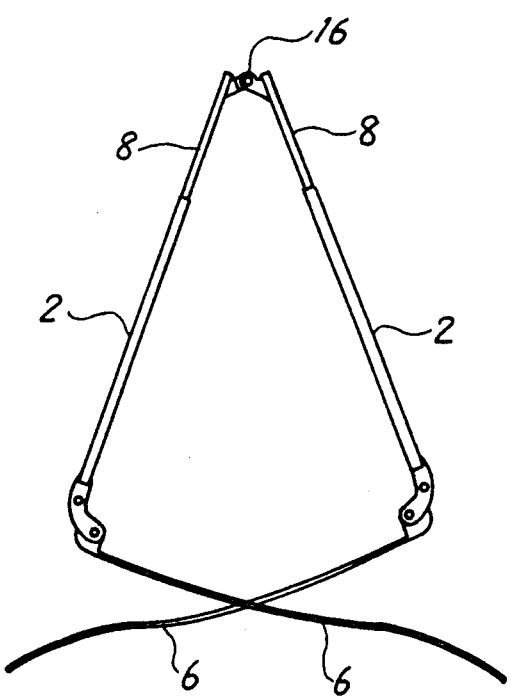
FIGS. 6 and 7 are plan view illustrating how to fold the spectacle frame of the invention.
Figure 7:
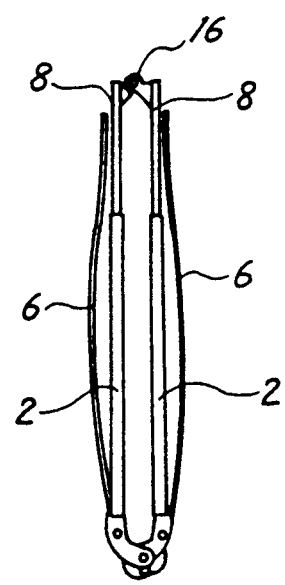
Figure 8:
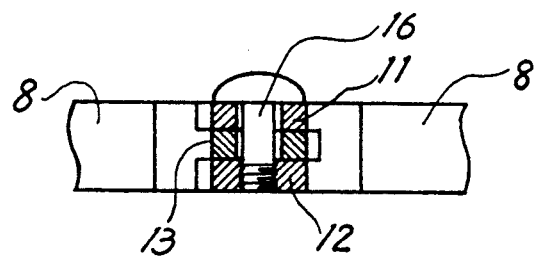
FIG. 8 is a sectional view corresponding to FIG. 3 and showing the hinge portion of the bridges of a conventional spectacle frame.
Figure 9:
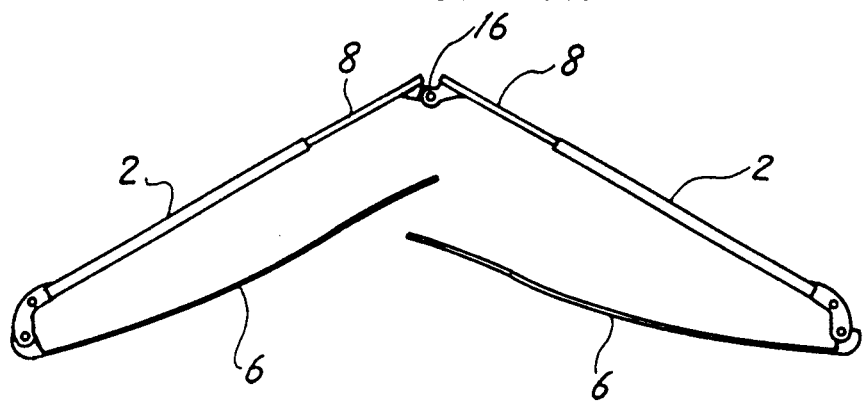
FIGS. 9 and 10 are plan views illustrating how to fold the conventional spectacle frame.
Figure 10:
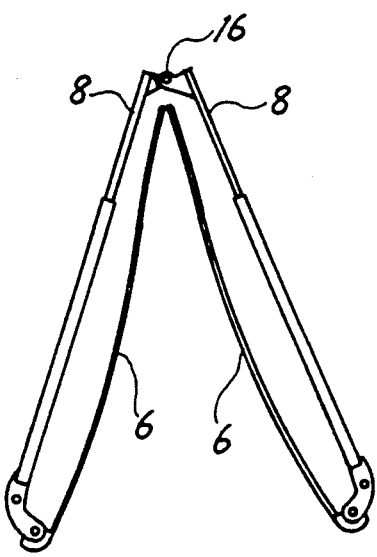

The spectacle frame can be folded in the following manner. First, the lens frames 2, 2 are moved inward about the pivot pin 16, whereby the lens frames are folded as inclined relative to each other as seen in FIGS. 4 and 5. Accordingly, the connector 4 on the right lens frame is positioned below the connector 4 on the left lens frame without collision. Next, the temples 6, 6 are moved inward, whereby the spectacle frame can be folded to a flat form of minimized size as shown in FIG. 7.

In the case where the lenses measure about cm x about 2 cm for use by the aged, the pivot pin is preferably inclined with about 0 to 8 degrees from its vertical position, so that the spectacles can be accomodated in a case of approximately the same size as a disposable lighter and is very convenient to carry about.

The temples are positionable over the outer faces of the lens frames and therefore serve to protect the lenses.

The present invention which has been described in detail can be modified variously within the scope of the invention as defined in the appended claims. For example, the recess and the projection providing the hinge portion on the bridges can be alternatively formed on the left and right sides, respectively.

What is claimed is:

1. A foldable spectacle frame comprising:
   a pair of lens frames,
   a pair of temples hingedly connected to the outer portions of the respective lens frames and movable toward the inner faces of the respective lens frames,
   first and second bridge each projecting from the inner portion of one of the lens frames toward the other lens frame and hingedly connected together at their forward ends inwardly movably,
   the hinge portion at the forward ends of the bridges having a pivot pin inclined at a small angle with a vertical line, so that when the spectacle frame is folded, the inner faces of the lens frames are opposed to each other with the temples opposed to the outer faces of the lens frames, and
   one of the bridges is formed in the vicinity of its forward end with a first block projecting inward, the block having first and second projections projecting respectively from the upper and lower portions of the outer end thereof in parallel to each other and inclined at a small angle with a horizontal plane to define a recess between the first and second projections, the first projection having a first hole, the second projection having a bore extending or not extending therethrough, the other bridge being formed in the vicinity of its forward end with a second block projecting inward, the second block having a third projection projecting from the central portion of the outer end thereof at the same angle of inclination as the first and second projections and fitting in the recess, the third projection having a second hole, the pivot pin being inserted in the first and second holes and the bore and fixed in place, as inclined slightly with respect to a vertical line in corresponding relation to the angle of inclination of the first to third projections.

2. A spectacle frame as defined in claim 1 wherein the angle of inclination of the pivot pin is about 3 to about 15 degrees.

3. A spectacle frame as defined in claim 1 wherein the pivot pin is screwed in the bore.

4. A spectacle frame as defined in claim 2 and further comprising:
   a pair of lenses, and
   said pair of lens frames having said pair of lenses fitted therein respectively.

* * * * *

UNITED STATES PATENT AND TRADEMARK OFFICE
CERTIFICATE OF CORRECTION

PATENT NO. : 5,028,126

DATED : July 2, 1991

INVENTOR(S) : YASUSHI TAKEUCHI

It is certified that error appears in the above-identified patent and that said Letters Patent is hereby corrected as shown below:

Column 2, line 37, "angle 8" should be --angle $\theta$--.

Column 3, line 11, "0 to 8 degrees" should read --6 to 8 degrees--.

Claim 1, column 3, line 30, "bridge" should be --bridges--.

Signed and Sealed this

Twenty-seventh Day of April, 1993

Attest:

MICHAEL K. KIRK

*Attesting Officer*            Acting Commissioner of Patents and Trademarks